(12) United States Patent
Suzuki

(10) Patent No.: US 12,488,546 B2
(45) Date of Patent: Dec. 2, 2025

(54) INFORMATION PROCESSING APPARATUS, INFORMATION PROCESSING METHOD, AND PROGRAM CAPABLE OF FLEXIBLY SETTING VIRTUAL OBJECTS IN VIRTUAL SPACE

(71) Applicant: SONY GROUP CORPORATION, Tokyo (JP)

(72) Inventor: Ryuichi Suzuki, Tokyo (JP)

(73) Assignee: SONY CORPORATION, Tokyo (JP)

( * ) Notice: Subject to any disclaimer, the term of this patent is extended or adjusted under 35 U.S.C. 154(b) by 39 days.

(21) Appl. No.: 18/331,550

(22) Filed: Jun. 8, 2023

(65) Prior Publication Data

US 2023/0316685 A1 Oct. 5, 2023

Related U.S. Application Data

(63) Continuation of application No. 17/567,422, filed on Jan. 3, 2022, now abandoned, which is a continuation of application No. 16/482,655, filed as application No. PCT/JP2018/003680 on Feb. 2, 2018, now Pat. No. 11,244,510.

(30) Foreign Application Priority Data

Mar. 15, 2017 (JP) ................................. 2017-049545

(51) Int. Cl.
*G06T 19/00* (2011.01)
*A63F 13/55* (2014.01)
*G06F 3/01* (2006.01)
*G06T 19/20* (2011.01)

(52) U.S. Cl.
CPC ............ *G06T 19/006* (2013.01); *A63F 13/55* (2014.09); *G06F 3/011* (2013.01); *G06T 19/20* (2013.01)

(58) Field of Classification Search
CPC ................... G06T 19/006; G06T 19/20; G06T 2219/2004; A63F 13/55; A63F 13/25; A63F 13/428; A63F 13/847; A63F 13/212; A63F 13/213; A63F 13/5255; A63F 13/211; G06F 3/011

See application file for complete search history.

(56) References Cited

U.S. PATENT DOCUMENTS 9,098,167 B1 * 8/2015 Issa ..................... G06F 3/04815
10,410,562 B2 * 9/2019 Osawa .................. G06T 3/4038
(Continued)

FOREIGN PATENT DOCUMENTS

JP 2008107895 A * 5/2008

OTHER PUBLICATIONS

JP-2008107895-A (Machine Translation on Jul. 9, 2020) (Year: 2008).*

*Primary Examiner* — Michael Le
(74) *Attorney, Agent, or Firm* — Paratus Law Group, PLLC

(57) ABSTRACT

Provided is information processing apparatus that includes an information acquisition unit that obtains first state information regarding a state of a first user and a setting unit that sets, on the basis of the first state information, a display mode of a second virtual object in a virtual space in which a first virtual object corresponding to the first user and the second virtual object corresponding to a second user are arranged.

23 Claims, 17 Drawing Sheets

(56) References Cited

U.S. PATENT DOCUMENTS

| | | | |
|---|---|---|---|
| 2005/0245302 A1* | 11/2005 | Bathiche | G06F 3/04815 434/335 |
| 2008/0158232 A1* | 7/2008 | Shuster | A63F 13/57 345/474 |
| 2012/0314871 A1* | 12/2012 | Koga | H04S 7/304 381/17 |
| 2014/0218361 A1* | 8/2014 | Abe | A63F 13/42 345/424 |
| 2015/0163473 A1* | 6/2015 | Osawa | H04N 13/344 348/53 |
| 2016/0252729 A1* | 9/2016 | Doucet | A63F 13/211 345/8 |
| 2016/0300387 A1* | 10/2016 | Ziman | G06F 3/165 |
| 2017/0024934 A1* | 1/2017 | Numaguchi | A63F 13/213 |
| 2018/0341386 A1* | 11/2018 | Inomata | A63F 13/211 |

* cited by examiner

| SCENE | STATIC PARAMETER |
|---|---|
| CONFERENCE | BASIC INFORMATION, DEPARTMENT, TITLE, ROLE (PRESENTER, CHAIRPERSON, LISTENER), FREQUENCY OF PARTICIPATION |
| CONCERT | BASIC INFORMATION, ROLE (PERFORMER, AUDIENCE), FREQUENCY OF PARTICIPATION |
| CLASS | BASIC INFORMATION, ROLE (TEACHER, STUDENT) |

FIG. 7

```
START
  ↓
OBTAIN STATIC PARAMETER —S102
  ↓
DETERMINE SCENE —S104
  ↓
SET ARRANGEMENT OF
VIRTUAL OBJECTS —S106
  ↓
GENERATE DISPLAY IMAGE
FOR EACH OF USERS —S108
  ↓
END
```

FIG. 8

| DISTANCE BETWEEN VIRTUAL OBJECTS | ESTIMATED EMOTION | DYNAMIC PARAMETER |
|---|---|---|
| REDUCE | POSITIVE | STRAINING EYES<br>LEANING FORWARD<br>PROJECTING LOUD VOICE |
| INCREASE | NEGATIVE | INCREASE IN BODY TEMPERATURE<br>INCREASE IN HEART RATE<br>TOUCHING HAIR<br>INCREASED FREQUENCY OF BLINKING<br>CROSSING ARMS<br>SWEATING |
| NO ALTERATION | NEUTRAL | NO DETECTION OF ABOVE STATES |

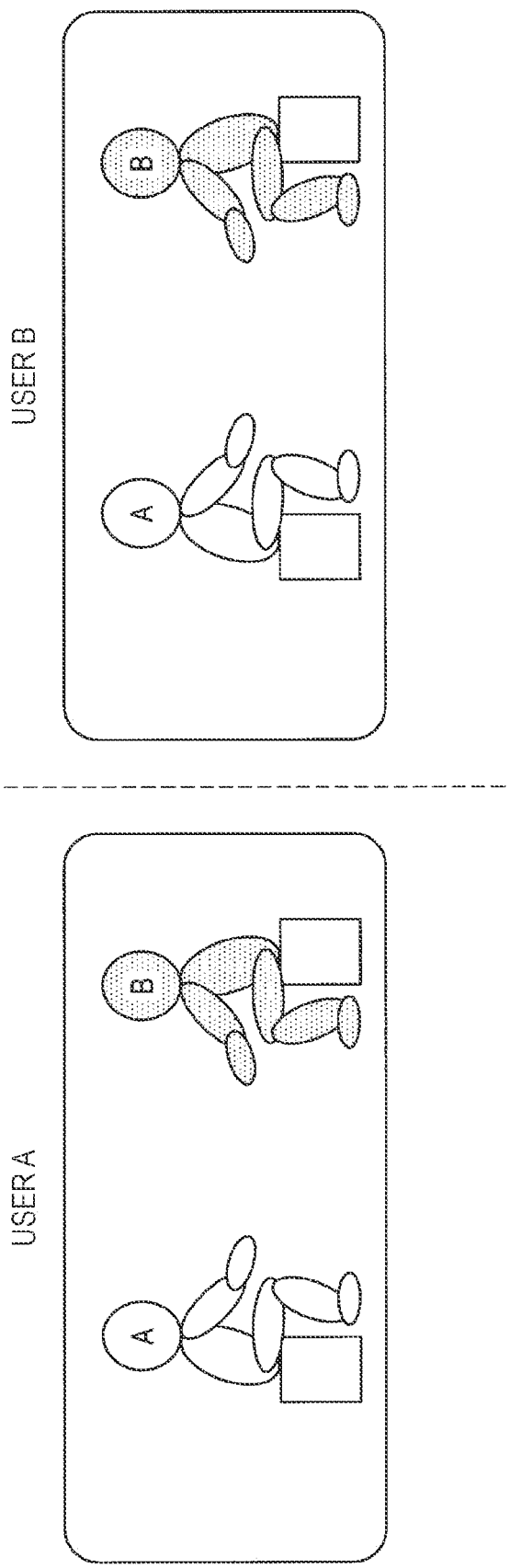

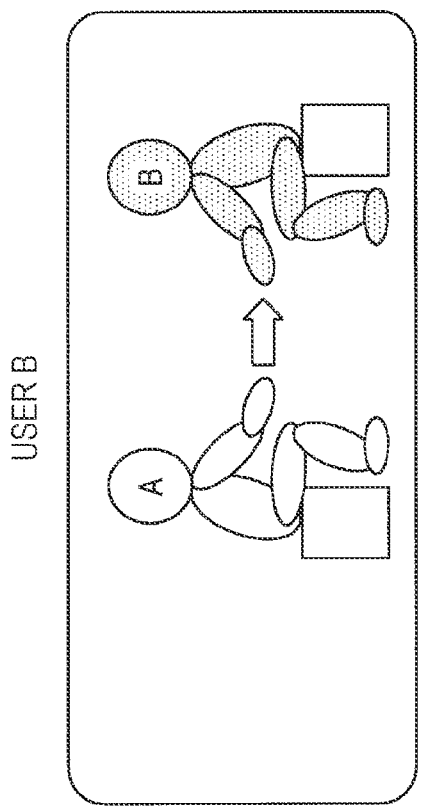
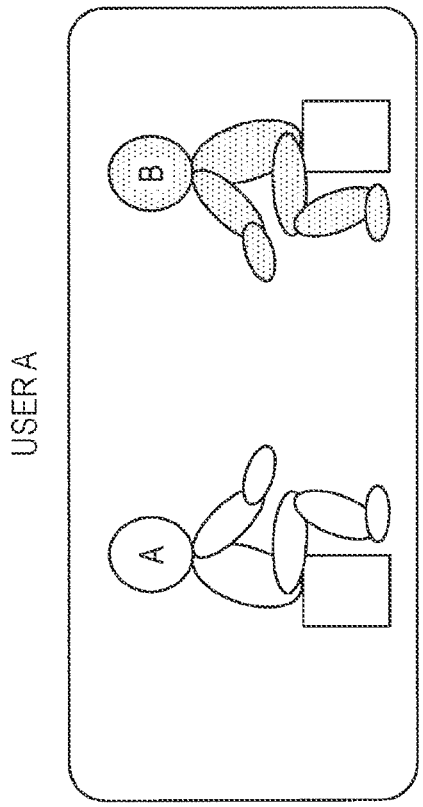
FIG. 10

FIG. 12
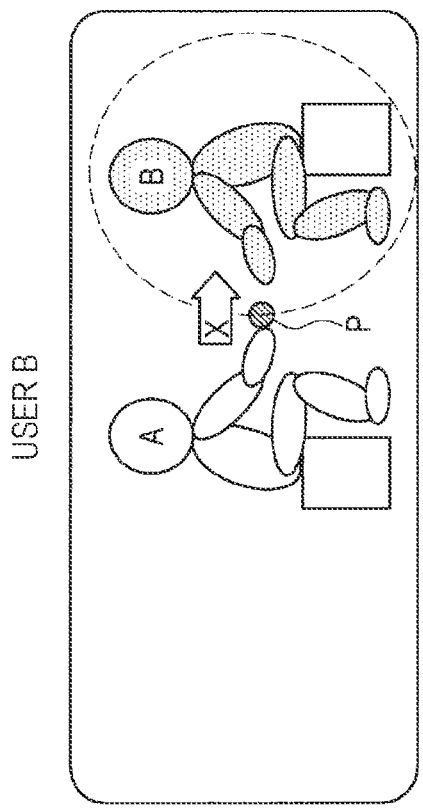
USER B
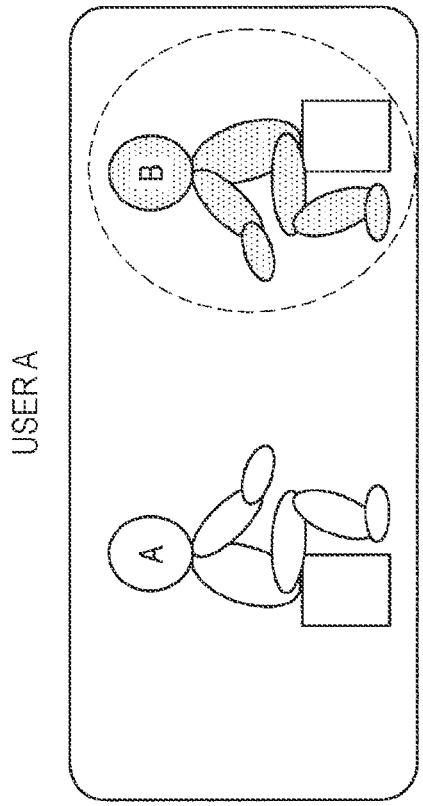
USER A

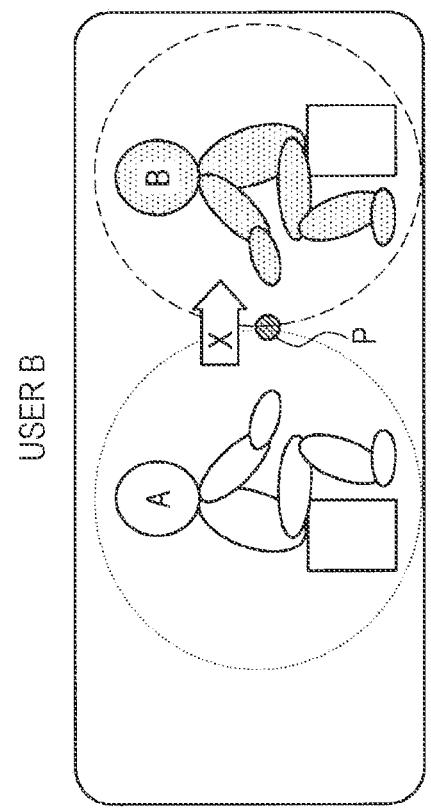
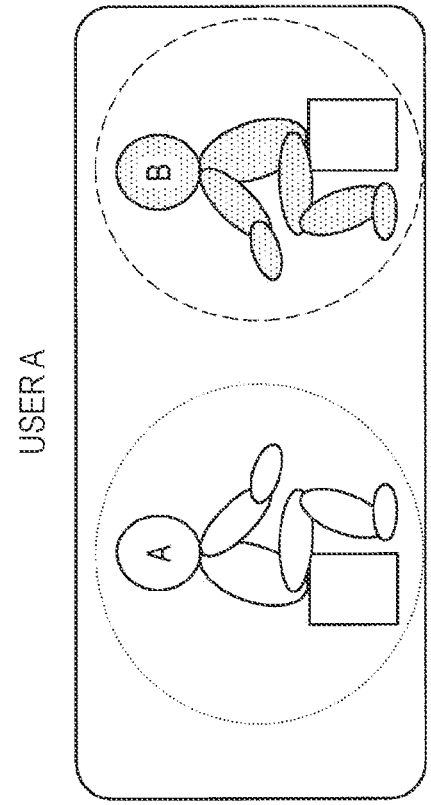
FIG. 13

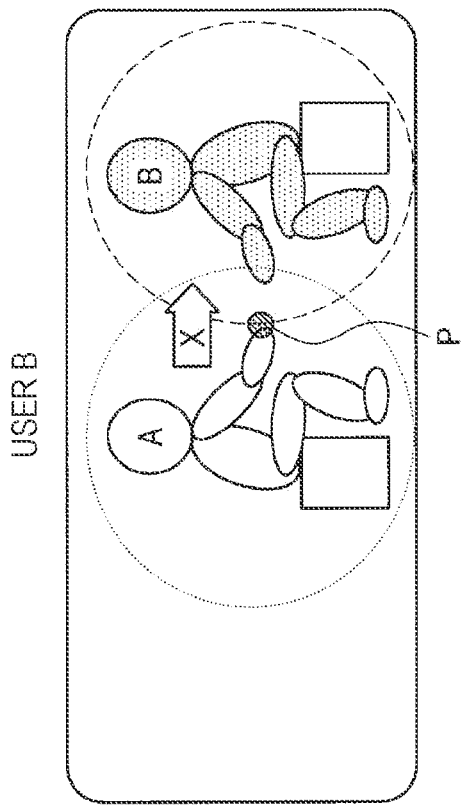
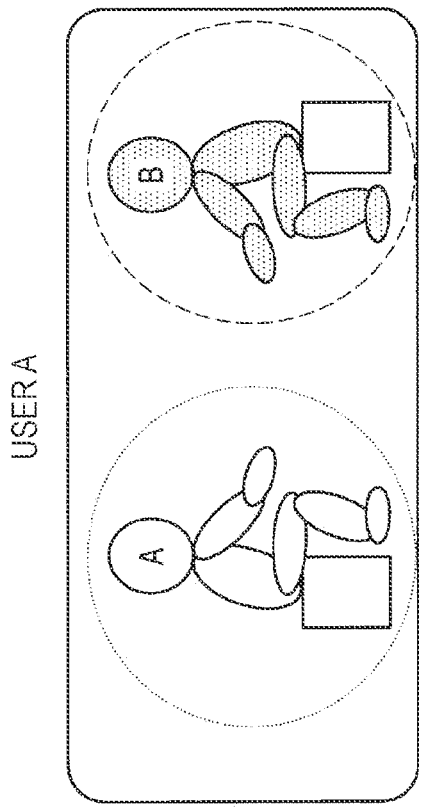
FIG. 14

FIG. 15
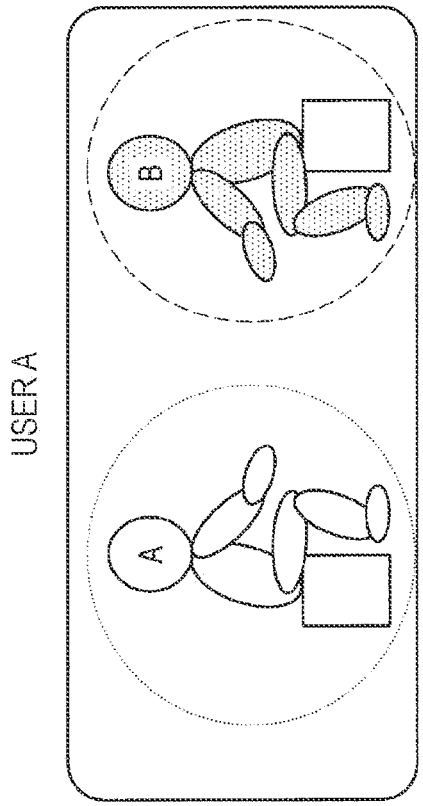
USER A
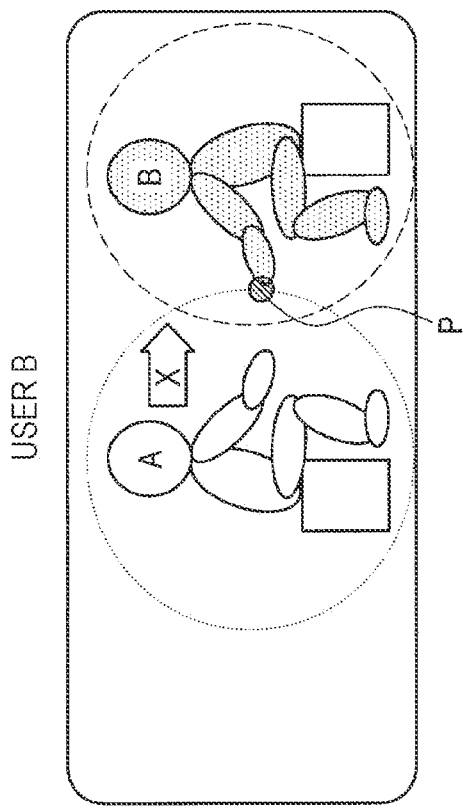
USER B

FIG. 18
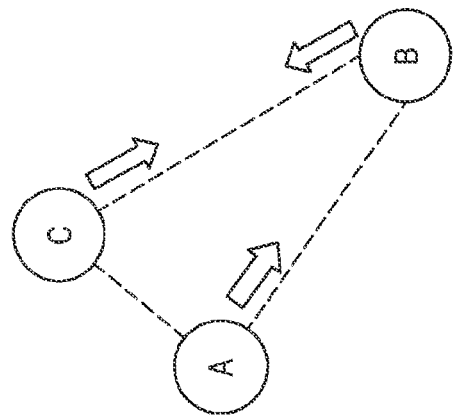
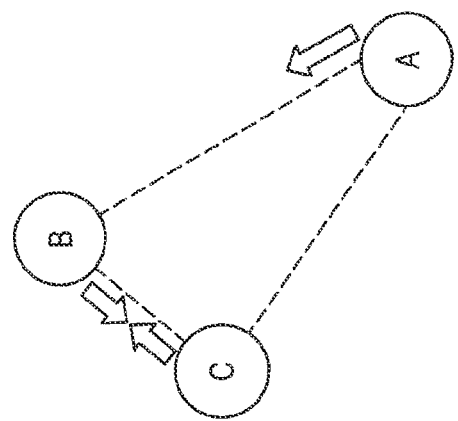
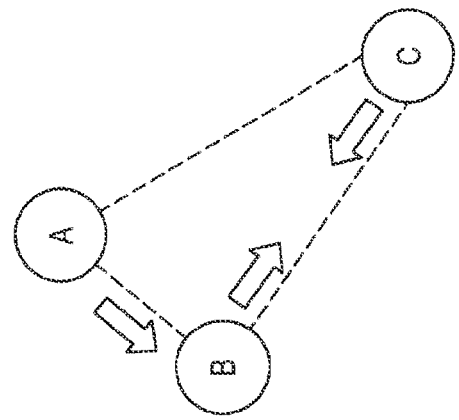

| GROUP | DYNAMIC PARAMETER |
|---|---|
| LISTEN SILENTLY | SITTING<br>PROJECTING NO VOICE |
| SING | PROJECTING VOICE |
| DANCE | STANDING<br>MOVING BODY |

INFORMATION PROCESSING APPARATUS, INFORMATION PROCESSING METHOD, AND PROGRAM CAPABLE OF FLEXIBLY SETTING VIRTUAL OBJECTS IN VIRTUAL SPACE

CROSS REFERENCE TO RELATED APPLICATIONS

The present application is a continuation of U.S. patent application Ser. No. 17/567,422, filed Jan. 3, 2022, which is a continuation application of U.S. patent application Ser. No. 16/482,655, filed on Jul. 31, 2019, now U.S. Pat. No. 11,244,510, which is a U.S. National Phase of International Patent Application No. PCT/JP2018/003680, filed on Feb. 2, 2018, which claims priority benefit of Japanese Patent Application No. JP 2017-049545, filed in the Japan Patent Office on Mar. 15, 2017. Each of the above-referenced is hereby incorporated herein by reference in its entirety.

TECHNICAL FIELD

The present disclosure relates to an information processing apparatus, an information processing method, and a program.

BACKGROUND ART

In recent years, services using virtual space have been widespread. For example, a user can experience a realistic feeling by playing a game using virtual space. Furthermore, a plurality of users located at remote locations can have a conference using a virtual space.

Patent Document 1 discloses a system related to a service using the above-described virtual space. The system disclosed in Patent Document 1 determines a position of a virtual object of each of users in the virtual space on the basis of the real user position.

CITATION LIST

Patent Document

Patent Document 1: Japanese Patent Application Laid-Open No. 2014-17776

SUMMARY OF THE INVENTION

Problems to be Solved by the Invention

However, the technology disclosed in Patent Document 1 determines the position of the virtual object on the basis of specific information such as the real user position, making it difficult to flexibly set the virtual object.

Therefore, the present disclosure is provided to propose an information processing apparatus, an information processing method, and a program capable of flexibly setting virtual objects in virtual space.

Solutions to Problems

According to the present disclosure, there is provided an information processing apparatus including: an information acquisition unit that obtains first state information regarding a state of a first user; and a setting unit that sets, on the basis of the first state information, a display mode of a second virtual object in a virtual space in which a first virtual object corresponding to the first user and the second virtual object corresponding to a second user are arranged.

Furthermore, according to the present disclosure, there is provided an information processing method including: obtaining first state information regarding a state of a first user; and a setting, by a processor, on the basis of the first state information, a display mode of a second virtual object in a virtual space in which a first virtual object corresponding to the first user and the second virtual object corresponding to a second user are arranged.

Furthermore, according to the present disclosure, there is provided a program for causing a processor to execute: obtaining first state information regarding a state of a first user; and setting, on the basis of the first state information, a display mode of a second virtual object in a virtual space in which a first virtual object corresponding to the first user and the second virtual object corresponding to a second user are arranged.

Effects of the Invention

According to the present disclosure, it is possible to flexibly set virtual objects in a virtual space.

Note that the above-described effect is not necessarily limited, and it is also possible to use any one of the effects illustrated herein together with the above-described effect or in place of the above-described effect, or other effects that can be assumed herein.

BRIEF DESCRIPTION OF DRAWINGS

FIG. 7 is a chart illustrating an example of an information processing method according to an embodiment of the present disclosure.

FIG. 8 is a diagram illustrating a relationship between dynamic parameters and a distance between virtual objects in an embodiment of the present disclosure.

FIG. 9 is a view illustrating an example of setting a distance between virtual objects according to an embodiment of the present disclosure.

FIG. 10 is a view illustrating an example of setting a distance between virtual objects according to an embodiment of the present disclosure.

FIG. 12 is a view illustrating an example of setting a distance between virtual objects according to an embodiment of the present disclosure.

FIG. 13 is a view illustrating an example of setting a distance between virtual objects according to an embodiment of the present disclosure.

FIG. 14 is a view illustrating an example of setting a distance between virtual objects according to an embodiment of the present disclosure.

FIG. 15 is a view illustrating an example of setting a distance between virtual objects according to an embodiment of the present disclosure.

FIG. 18 is a view illustrating an example of setting a distance between virtual objects according to an embodiment of the present disclosure.

MODE FOR CARRYING OUT THE INVENTION

Figure 1:
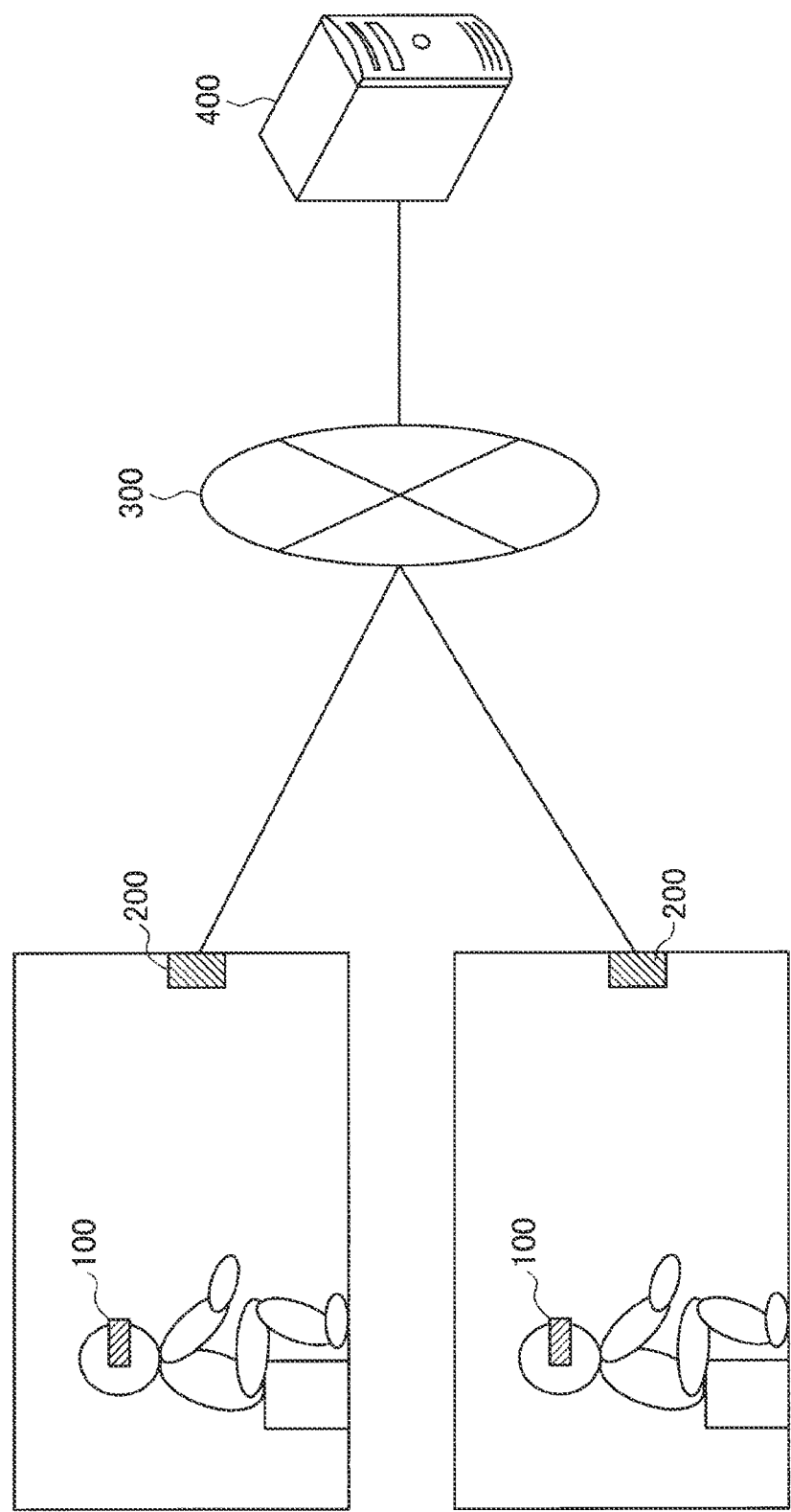
FIG. 1 is a view schematically illustrating an information processing system according to an embodiment of the present disclosure.

Preferred embodiments of the present disclosure will be described in detail below with reference to the accompanying drawings. Note that same reference numerals are assigned to constituent elements having substantially the same functional configuration, and thus redundant description is omitted in the description herein and the drawings.

Note that description will be presented in the following order. 1. Configuration of information processing system 2. Configuration of devices constituting information processing system 3. Virtual object setting method using static parameter 4. Virtual object setting method using dynamic parameter 5. Grouping virtual objects using dynamic parameter 6. Hardware configuration of device 7. Supplementary matter 8. Conclusion <1. Configuration of information processing system>
Hereinafter, an overview of an information processing system according to an embodiment of the present disclosure will be described. FIG. 1 is a view illustrating a configuration of an information processing system according to the present embodiment. The information processing system according to the present embodiment includes a display device 100, a state detection device 200, a network 300, and a server 400. Note that the display device 100, the state detection device 200, and the server 400 are an example of an information processing apparatus that executes information processing of the present embodiment. Furthermore, the display device 100 and the state detection device 200 may be configured by one information processing apparatus.

In the information processing system according to the present embodiment, a service using a virtual space is provided. The server 400 performs control of the virtual space and generates image information regarding the virtual space. Subsequently, the server 400 transmits the generated image information to the display device 100 of each of users via the network 300. The display device 100 of each of users presents the user with a picture regarding the virtual space on the basis of the received image information.

Furthermore, the information processing system according to the present embodiment sets the position of the virtual object corresponding to each of users on the basis of a static parameter of each of the users. A static parameter includes user's attribute or user's role in the virtual space. Furthermore, a plurality of scenes is set in the virtual space. For example, a plurality of scenes in the virtual space includes a scene such as a conference, a class, a concert, a play, a movie, an attraction, or a game.

For example, in a case where the scene is a conference and the user's role is a presenter, the virtual object is arranged at a position of the user giving presentation in the virtual space. By arranging virtual objects in this manner, for example, the user can easily receive a service using a virtual space without a need to set the positions of the virtual objects in the virtual space. This enables the user to further concentrate on the user's purpose. The method of arranging virtual objects using static parameters will be described later with reference to FIGS. 4 to 7.

Furthermore, the information processing system according to the present embodiment sets the position of the virtual object corresponding to each of users on the basis of a user's dynamic parameter. The dynamic parameter includes information regarding user's behavior or user's biometric information indicating the user's state. Accordingly, dynamic parameters may also be referred to as user state information. Note that the information regarding user's behavior includes any one of pieces of information regarding user's facial expression, blinks, posture, vocalization, and a line-of-sight direction. Furthermore, the user's biometric information includes any one of pieces of information regarding user's heart rate, body temperature, and perspiration.

User's dynamic parameters are detected by the display device 100 and/or the state detection device 200. Note that the dynamic parameter may be detected by a wearable device worn by the user. The detected dynamic parameters are transmitted to the server 400. The server 400 controls the virtual object on the basis of the received dynamic parameter.

For example, the server 400 estimates user's emotion on the basis of the user's dynamic parameter. The estimated user's emotion may be categorized into a plurality of categories. For example, estimated emotions may be categorized into three categories, namely, positive, neutral (normal) and negative. Subsequently, the server 400 controls the virtual object on the basis of the estimated user's emotion.

For example, the server 400 may set a distance between the plurality of virtual objects on the basis of the estimated user's emotion. At this time, in a case where the estimated emotion is positive, the server 400 may reduce the distance between the plurality of virtual objects. Furthermore, in a case where the estimated emotion is negative, the server 400 may increase the distance between the plurality of virtual objects. In this manner, by setting the distance between virtual objects, the user can, for example, stay away from a virtual object of an unpleasant user and approach a virtual object of a cozy user. Therefore, the information processing system according to the present embodiment can automatically set a distance comfortable for each of users from the user's unconscious action, such as the user's posture or facial expression during communication, and automatically adjust a distance to the other party.

Furthermore, the server 400 may present a virtual space picture mutually different for each of users. For example, in a case where the user A is estimated to have a negative emotion toward the user B, the server 400 may display the virtual object of the user B at a separate position in the picture of the virtual space provided to the display device 100 of the user A. In contrast, the server 400 need not alter the distance to the virtual object of the user A in the picture of the virtual space provided to the display device 100 of the user B. In this manner, by setting the distance between the virtual objects, for example, the user A can stay away from a virtual object of an unpleasant user while preventing the unpleasant feeing of the user A about the user B from being recognized by the user B. Accordingly, the information processing system of the present embodiment can adjust the position of the virtual object to a position enabling the user to easily perform communication without giving an unpleasant feeling to the other party. The setting of virtual objects using dynamic parameters will be described later with reference to FIGS. 8 to 20.

<2. Configuration of devices constituting information processing system> Hereinabove, the overview of the information processing system according to the embodiment of the present disclosure has been described. Hereinafter, the configuration of devices constituting the information processing system according to an embodiment of the present disclosure will be described.

Figure 2:
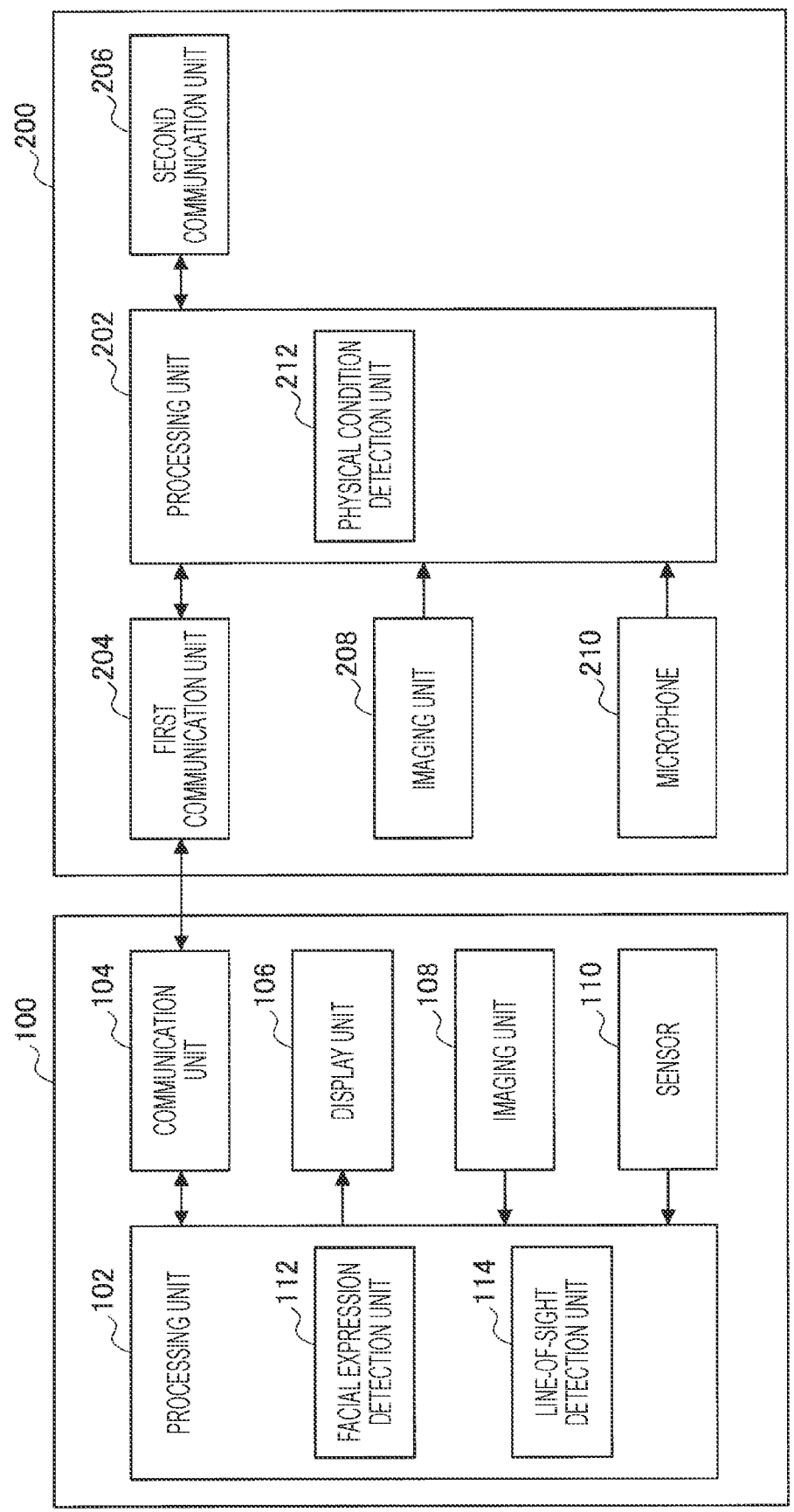
FIG. 2 is a diagram illustrating a configuration of a display device and a state detection device according to an embodiment of the present disclosure.

(2-1. Configuration of display device and state detection device) FIG. 2 is a diagram illustrating an example of a configuration of the display device 100 and the state detection device 200 of the present embodiment. First, a configuration of the display device 100 will be described. The display device 100 according to the present embodiment includes, for example, a processing unit 102, a communication unit 104, a display unit 106, an imaging unit 108, and a sensor 110. Furthermore, the processing unit 102 includes a facial expression detection unit 112 and a line-of-sight detection unit 114. Alternatively, the display device 100 according to the present embodiment may be a head mounted display mounted on the head of the user.

The processing unit 102 processes a signal from each of configurations of the display device 100. For example, the processing unit 102 performs decode processing on a signal transmitted from the communication unit 104 and extracts data. Furthermore, the processing unit 102 processes image information to be transmitted to the display unit 106. Furthermore, the processing unit 102 may also process data obtained from the imaging unit 108 or the sensor 110.

The communication unit 104 is a communication unit that communicates with an external device (the state detection device 200 in FIG. 2) by near field communication, and may perform communication using, for example, a communication scheme (for example, Bluetooth (registered trademark)) defined by the IEEE 802 committee. Alternatively, the communication unit 104 may perform communication using a communication scheme such as Wi-Fi. Note that the above-described communication scheme is an example, and the communication scheme of the communication unit 104 is not limited to it.

The display unit 106 is used to display an image. For example, the display unit 106 displays a virtual space image based on data received from the server 400. The imaging unit 108 is used to capture the user's face. In the present embodiment, the imaging unit 108 is used particularly for imaging the eyes of the user.

The sensor 110 senses the movement of the display device 100. For example, the sensor 110 includes an acceleration sensor, a gyro sensor, a geomagnetic sensor, or the like. The acceleration sensor senses acceleration on the display device 100. The gyro sensor senses angular acceleration and angular velocity with respect to the display device 100. The geomagnetic sensor senses geomagnetism. The direction of the display device 100 is calculated on the basis of the sensed geomagnetism.

The facial expression detection unit 112 detects the user's facial expression on the basis of the image information obtained from the imaging unit 108. For example, the facial expression detection unit 112 may detect the user's facial expression by pattern matching. Specifically, the facial expression detection unit 112 may compare the shape or movement of the human eyes in the statistically classified predetermined facial expression with the shape or movement of the user's eyes obtained from the imaging unit 108 to detect the user's facial expression.

The line-of-sight detection unit 114 detects the user's line-of-sight on the basis of the image information obtained from the imaging unit 108 and the data obtained from the sensor 110. Specifically, the line-of-sight detection unit 114 may detect the direction of the user's head on the basis of the data obtained from the sensor 110, and may detect the movement of the user's eyeballs obtained from the imaging unit 108 and may thereby detect the user's line-of-sight. Furthermore, the line-of-sight detection unit 114 may detect a blink on the basis of the image information obtained from the imaging unit 108.

Hereinabove, the configuration of the display device 100 according to the embodiment of the present disclosure has been described. Next, a configuration of the state detection device 200 according to an embodiment of the present disclosure will be described.

The state detection device 200 of the present embodiment is used to obtain state information regarding the state of the user. State information includes information regarding user's behavior and information regarding user's biometric information. The state detection device 200 includes a processing unit 202, a first communication unit 204, a second communication unit 206, and an imaging unit 208, for example. Furthermore, the processing unit 202 further includes a physical condition detection unit 212.

The processing unit 202 processes a signal from each of configurations of the state detection device 200. For example, the processing unit 202 may process the signal transmitted from the first communication unit 204. The processing unit 202 may also process data obtained from the imaging unit 208.

The first communication unit 204 is a communication unit that communicates with an external device (the display device 100 in FIG. 2) by near field communication, and may perform communication using, for example, a communication scheme (for example, Bluetooth (registered trademark)) defined by the IEEE 802 committee. Furthermore, the first communication unit 204 may perform communication using a communication scheme such as Wi-Fi. Note that the above-described communication scheme is an example, and the communication scheme of the first communication unit 204 is not limited to it.

The second communication unit 206 is a communication unit that communicates with an external device (the server 400 in the present embodiment) by wired or wireless communication, and may perform communication using a communication scheme compliant with Ethernet (registered trademark), for example.

The imaging unit 208 is used to capture the entire body of the user. Furthermore, the imaging unit 208 may sense infrared light. The microphone 210 obtains audio data from sounds around the state detection device 200.

The physical condition detection unit 212 determines the user's behavior and biometric information on the basis of the image information obtained from the imaging unit 208. For example, the physical condition detection unit 212 may detect the user's motion or posture by performing known image processing such as edge detection. For example, the physical condition detection unit 212 may detect states where the user is leaning forward, the user is crossing own arms, or the user is sweating. Furthermore, the physical condition detection unit 212 may detect the body temperature of the user on the basis of the infrared light data obtained from the imaging unit 208. Furthermore, the physical condition detection unit 212 may detect a state where the user is projecting voice on the basis of audio data obtained from the microphone 210. Furthermore, the physical condition detection unit 212 may obtain information regarding user's heartbeat from a wearable terminal worn by the user.

Note that in FIG. 2, the display device 100 and the state detection device 200 are configured as separate two devices. Alternatively, however, the display device 100 and the state detection device 200 may be configured as one device. For example, the display device 100 and the state detection device 200 as illustrated in FIG. 2 may be configured by using the display device 100 installed apart from the user, such as a television having an imaging device and a microphone. In this case, the line-of-sight, facial expression, behavior, or biometric information of the user may be detected on the basis of data from the imaging device. Furthermore, the state where the user is projecting voice may be detected on the basis of the data from the microphone.

(2-2. Configuration of server) Hereinabove, configurations of the display device 100 and the state detection device 200 according to the embodiment of the present disclosure have been described. Hereinafter, a configuration of the server 400 according to an embodiment of the present disclosure will be described.

Figures 3, 4:
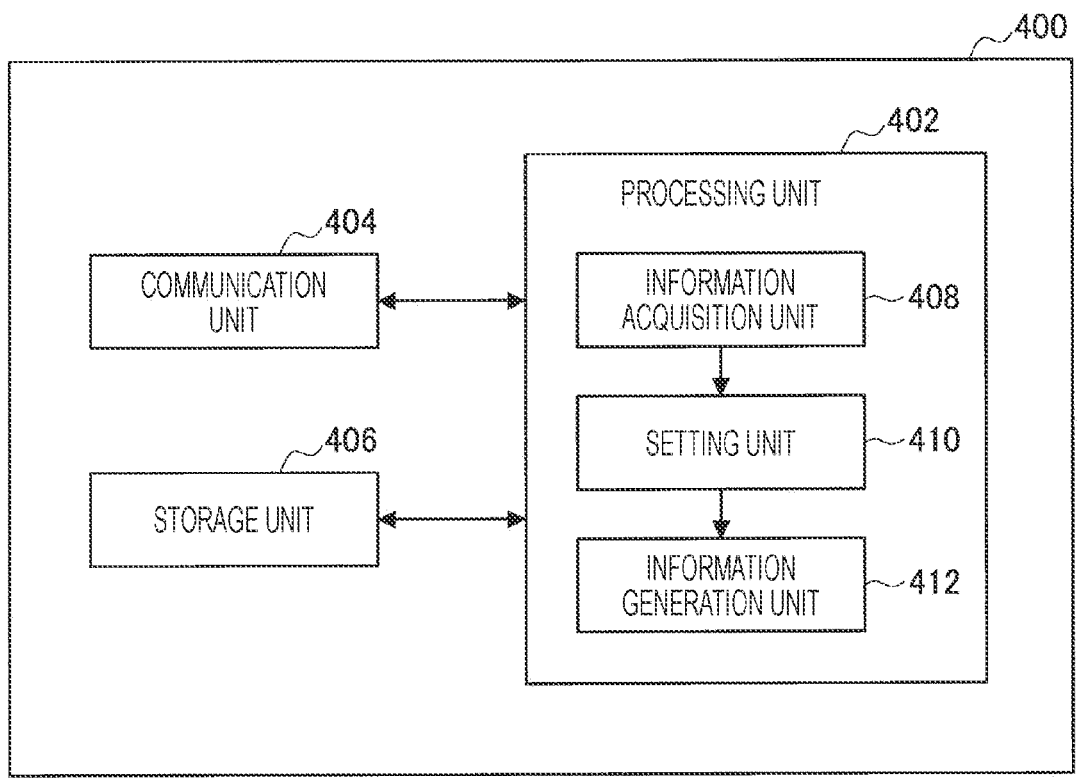
FIG. 3 is a diagram illustrating a configuration of a server according to an embodiment of the present disclosure.
FIG. 4 is a diagram illustrating a relationship between scenes in a virtual space and static parameters in an embodiment of the present disclosure.

FIG. 3 is a diagram illustrating an example of a configuration of the server 400 capable of performing processing according to the information processing method of the present embodiment. The server 400 includes a processing unit 402, a communication unit 404, and a storage unit 406, for example. The processing unit 402 further includes an information acquisition unit 408, a setting unit 410, and an information generation unit 412.

The processing unit 402 processes a signal from each of configurations of the server 400. For example, the processing unit 402 performs decode processing on a signal transmitted from the communication unit 404 and extracts data. The processing unit 402 also reads data from the storage unit 406 and processes the read-out data.

Furthermore, the processing unit 402 performs various types of processing on the virtual space. Note that the processing unit 402 may set a virtual space for the display device 100 of each of users, and may present a mutually different virtual space picture onto the display device 100 of each of the users on the basis of arrangement of the virtual objects in the plurality of virtual spaces, or the like. That is, the position of the virtual object in the virtual space with respect to the display device 100 of each of users is different for each of the virtual spaces.

Furthermore, the processing unit 402 may perform processing on one virtual space, and may present a mutually different virtual space picture onto the display device 100 of each of users on the basis of the arrangement of virtual objects in the one virtual space, or the like. That is, the processing unit 402 may correct the arrangement of virtual objects in the one virtual space, and may generate image information for the display device 100 of each of users. By performing processing on one virtual space in this manner, it is possible to reduce processing load on the processing unit 402.

The communication unit 404 is a communication unit that communicates with an external device by wired or wireless communication, and may perform communication using a communication scheme compliant with Ethernet (registered trademark), for example. The storage unit 406 stores various types of data used by the processing unit 402.

The information acquisition unit 408 obtains dynamic parameters of the user, which will be described later, from the display device 100 or the state detection device 200. Furthermore, the information acquisition unit 408 obtains static parameters of the user described later from the storage unit 406 or an application.

The setting unit 410 performs setting or alteration for the virtual space on the basis of the static parameter or the dynamic parameter obtained by the information acquisition unit 408. For example, the setting unit 410 may perform setting for the virtual object that corresponds to the user in the virtual space. Specifically, the setting unit 410 sets the arrangement of virtual objects. Furthermore, the setting unit 410 sets the distance between virtual objects.

The information generation unit 412 generates image information to be displayed on the display device 100 on the basis of the setting made by the setting unit 410. Note that the information generation unit 412 may generate image information of mutually different virtual spaces for the display device 100 of each of users, as described above.

<3. Virtual object setting method using static parameter>
Hereinabove, the configuration of devices constituting the information processing system according to an embodiment of the present disclosure has been described. Hereinafter, a virtual object setting method using a static parameter according to an embodiment of the present disclosure will be described.

In the present embodiment, setting for a virtual object in the virtual space is performed using a static parameter of the user. For example, in the information processing system according to the present embodiment, the position of the virtual object is set on the basis of the static parameter of the user. Note that the static parameter may be information preliminarily stored in the storage unit 406 or the like of the server 400, representing information that would not be altered during execution of information processing of the present embodiment, on the basis of the information detected by the sensor 110, the imaging unit 108, 208 or the like.

Furthermore, the information processing system according to the present embodiment uses preliminarily set scenes in the virtual space, in a case where the setting for the virtual object described above is performed. For example, the scenes in the virtual space include a scene of a conference, a class, a concert, a play, a movie, an attraction, a game, or the like.

FIG. 4 is a diagram illustrating a relationship between the scenes in the virtual space and static parameters used to set the virtual object. For example, in a case where the scene is a conference, information regarding user attributes, such as basic information of the user, department to which the user belongs, and title of the user, is used to set the virtual object. Note that the basic information of the user may include age, gender, nationality, language, and physical information of the user. Here, the physical information may include information regarding the height and weight of the user. Furthermore, information regarding the user's role in the conference (for example, a presenter, a chairperson, a listener) and information regarding frequency of participation in the conference may be used for setting of the virtual object.

Note that the role of the user may be set by the user or may be obtained from an application for schedule management. For example, in a case where the user is registered as a presenter in the conference on a schedule management application, information regarding the role may be obtained from the application. Furthermore, information regarding a scene (in this example, a conference) may also be obtained from the application in a similar manner. In this manner, with information obtained from the application, the user can more easily receive service using the virtual space without performing setting in the virtual space. This enables the user to further concentrate on the user's purpose.

Furthermore, in a case where the scene is a concert, user's basic information, information regarding user's role in the concert (for example, performer or audience) or regarding frequency of participation in the concert may be used for the setting of the virtual object. Furthermore, in a case where the scene is a class, user's basic information and information regarding the user's role in the class (for example, teacher or student) may be used for the setting of the virtual object.

Figure 5:
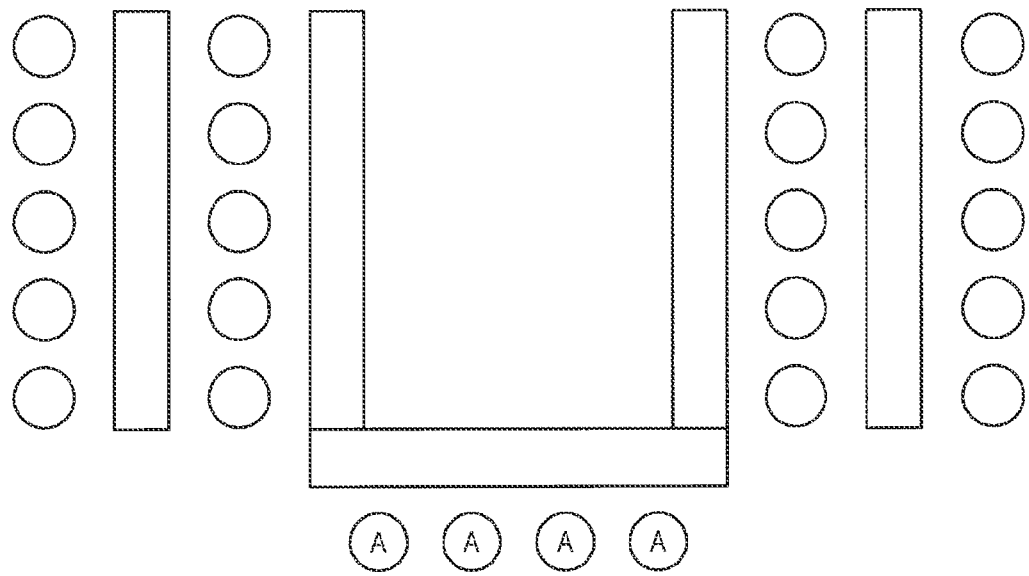
FIG. 5 is a view illustrating a configuration of a conference scene in an embodiment of the present disclosure.

FIG. 5 is a view illustrating a layout of preliminarily set virtual objects in a case where a conference is set as a scene. The positions represented by open circles in FIG. 5 indicate positions at which user's virtual objects can be arranged.

For example, a virtual object of a user being a presenter or a chairperson may be arranged at a position indicated by "A". Furthermore, a virtual object of a user being a listener may be arranged at a position other than the position indicated by "A".

Furthermore, among the users being listeners, a virtual object of the user having a high-rank title may be arranged at a position near the position indicated by "A". Furthermore, among users being listeners, a virtual object of the user having high frequency of participation in a conference regarding a predetermined purpose (for example, a conference related to a predetermined project) may be arranged near a position indicated by "A". Furthermore, virtual objects of users of the same gender may be arranged adjacent to each other. Furthermore, virtual objects of users belonging to a same department may be arranged adjacent to each other.

Figure 6:
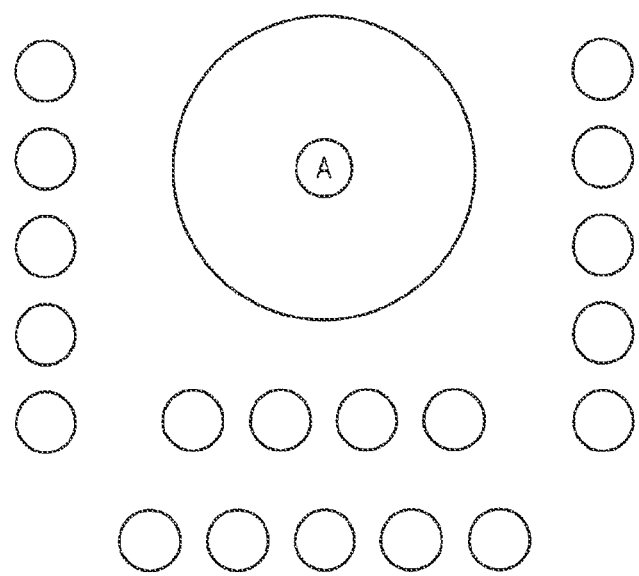
FIG. 6 is a view illustrating a configuration of a concert scene in an embodiment of the present disclosure.

FIG. 6 is a view illustrating a layout of virtual objects in a case where a concert is set as a scene. In FIG. 6, for example, the virtual object of the user being a performer may be arranged at the position indicated by "A". Furthermore, the virtual object of the user being the audience may be arranged at a position other than the position indicated by "A".

Furthermore, among users who are audience, virtual objects of users having high frequency of participation in a particular performer's concert may be arranged at a position near the position indicated by "A". Furthermore, virtual objects of users of the same gender may be arranged adjacent to each other.

As described above, the information processing system of the present disclosure sets the position of the virtual object corresponding to the user on the basis of the static parameter of the user. By arranging the virtual objects in this manner, the user can easily receive a service using a virtual space without a need to set the position of the virtual objects in the virtual space.

FIG. 7 is a flowchart illustrating information processing for setting virtual objects using the above-described static parameters. In S102, the information acquisition unit 408 obtains static parameters of the user from the storage unit 406 or an application.

Next, in S104, the setting unit 410 determines a scene in a virtual space. For example, the setting unit 410 may set a scene on the basis of registration information from the user, or may set a scene on the basis of information from an application.

In S106, the setting unit 410 arranges virtual objects on the basis of the static parameters obtained in S102 and the scene determined in S104. Subsequently, the information generation unit 412 generates, in S108, a display image for the display device 100 of each of users on the basis of the arrangement of the virtual objects set in S106, or the like.

<4. Virtual object setting method using dynamic parameter> Hereinabove, a virtual object setting method using a static parameter according to an embodiment of the present disclosure has been described. Hereinafter, a virtual object setting method using a dynamic parameter according to an embodiment of the present disclosure will be described.

In the present embodiment, setting for a virtual object in the virtual space is performed using a dynamic parameter of the user. For example, in the information processing system according to the present embodiment, the position of the virtual object is set on the basis of the dynamic parameter of the user. Specifically, in the information processing system according to the present embodiment, the distance between a plurality of virtual objects is set on the basis of the dynamic parameter of the user. Note that the dynamic parameter represents information that would be sequentially updated during execution of information processing of the present embodiment on the basis of information detected by the sensor 110, the imaging unit 108, 208 or the like.

FIG. 8 is a diagram illustrating relationships among dynamic parameters used for virtual object setting, user's emotions estimated using the dynamic parameters, and distances between the virtual objects to be set. As illustrated in FIG. 8, the dynamic parameters are categorized in association with the distances between virtual objects to be set or the estimated user's emotions.

In FIG. 8, dynamic parameters include information regarding user's behavior and user's biometric information. For example, user's behavior may include behaviors of user, such as "straining eyes", "leaning forward", "projecting a loud voice", "touching the hair", "blinking", "crossing own arms" or sweating. Furthermore, the user's biometric information may include information regarding the user's "body temperature" and "heartbeat".

In addition, dynamic parameters are used to estimate the user's emotions. According to FIG. 8, by user's states such as straining eyes, leaning forward, or projecting a loud voice, the user is estimated to be in a positive emotion. Furthermore, by user's states such as touching the hair, blinking a lot (frequently), crossing own arms, or sweating, the user is estimated to be in a negative emotion. Furthermore, in a case where there is an increase in body temperature or the heart rate of the user, the user is estimated to be in a negative emotion. Furthermore, in a case where no above user's condition is detected, the user's emotion is estimated to be neutral.

Note that the emotion estimated as the dynamic parameter described above is a non-limiting example. Furthermore, the relationship between the dynamic parameter described above and the estimated emotion is a non-limiting example For example, the user's emotion may be estimated to be positive in a case where the user's body temperature has increased.

Additionally, in a case where the estimated user's emotion is positive, the distance between virtual objects is to be reduced. Furthermore, in a case where the estimated user's emotion is negative, the distance between virtual objects is to be increased. Furthermore, in a case where the estimated user's emotion is neutral, the distance between virtual objects is not to be altered. In addition, the degree of changing the distance may be uniform, or may be variable in accordance with a detected dynamic parameter. For example, the degree of changing the distance may be varied in accordance with the degree of increase in the user's heart rate.

FIGS. 9 to 15 are views illustrating changes in distance between virtual objects in the information processing system of the present embodiment. Note that in the present embodiment, a mutually different virtual space picture is presented to the display device 100 of each of users. As described above, an individual virtual space may be set for the display device 100 of each of users and a mutually different virtual space picture may be presented onto the display device 100 of each of the users on the basis of arrangement of the virtual objects in the plurality of virtual spaces, or the like. Furthermore, a mutually different virtual space picture may be presented on the display device 100 of each of users on the basis of the arrangement of virtual objects in one virtual space shared by the display devices 100 of a plurality of users, or the like.

Hereinafter, for the sake of simplicity, an example of setting a virtual space for the display device 100 of each of users will be described. Therefore, in FIGS. 9 to 15, the view illustrated as "User A" represents a virtual space for the display device 100 of a user A, while the view illustrated as "User B" represents the display device 100 of a user B.

FIG. 9 is a view illustrating an initial position of a virtual object set on the basis of the above-described static parameter. As illustrated in FIG. 9, initially, the distance between virtual objects in the virtual space for the display device 100 of the user A is equal to the distance between virtual objects in the virtual space for the display device 100 of the user B.

FIG. 10 is a view illustrating alteration in distance between virtual objects in a case where user's positive emotion is estimated. For example, in a case where the user B leans forward, the user B is estimated to have a positive emotion toward the user A. Accordingly, the distance between virtual objects in the virtual space for the display device 100 of the user B is reduced. That is, in the virtual space for the display device 100 of the user B, the virtual object corresponding to the user A approaches the virtual object corresponding to the user B. Note that in this case, the display device 100 of the user B sets a display mode of the virtual object of the user A such that the virtual object of the user A is arranged at a position close to the user B. That is, the display device 100 of the user B sets a display mode of the virtual object of the user A such that the virtual object of the user A is displayed in large size.

In contrast, even in a case where the user B is estimated to have a positive emotion toward the user A, the distance between virtual objects in the virtual space for the display device 100 of the user A would not be altered.

Figure 11:
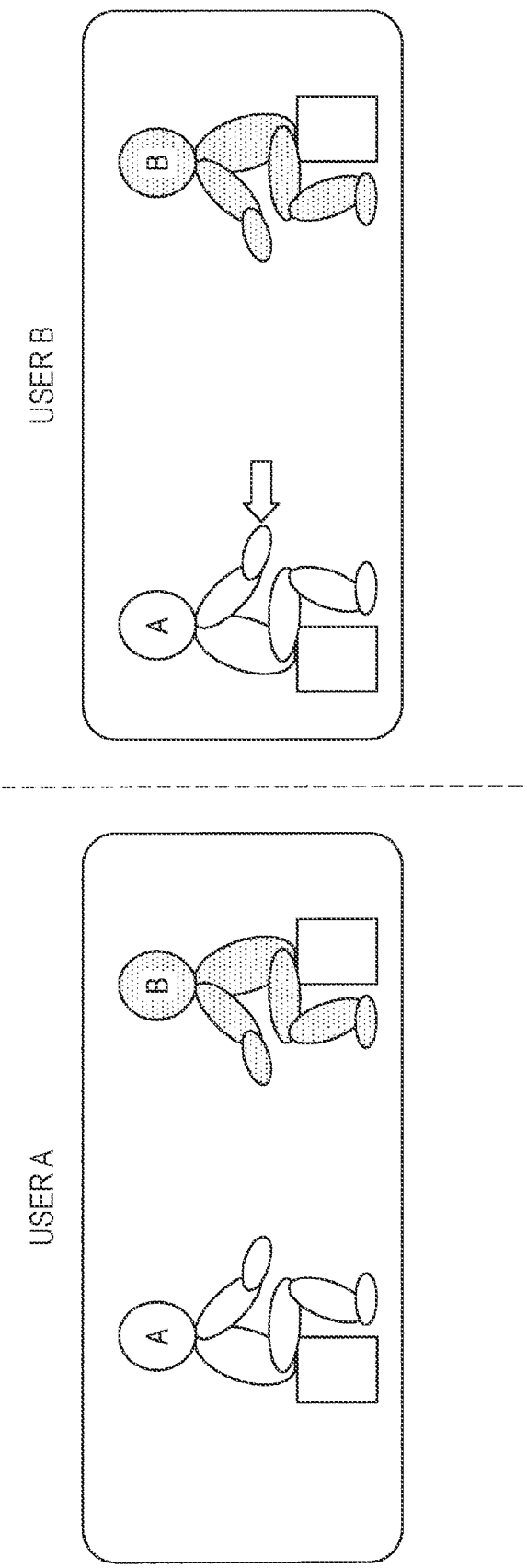
FIG. 11 is a view illustrating an example of setting a distance between virtual objects according to an embodiment of the present disclosure.

FIG. 11 is a view illustrating alteration in distance between virtual objects in a case where user's negative emotion is estimated. For example, in a case where the user B crosses own arms, the user B is estimated to have a negative emotion toward the user A. Accordingly, the distance between virtual objects in the virtual space for the display device 100 of the user B is increased. That is, in the virtual space for the display device 100 of the user B, the virtual object corresponding to the user A moves away from the virtual object corresponding to the user B. Note that in this case, the display device 100 of the user B sets a display mode of the virtual object of the user A such that the virtual object of the user A is arranged at a position distant from the user B. That is, the display device 100 of the user B sets a display mode of the virtual object of the user A such that the virtual object of the user A is displayed in a small size.

In contrast, even in a case where the user B is estimated to have a negative emotion toward the user A, the distance between virtual objects in the virtual space for the display device 100 of the user A would not be altered. As described above, since mutually different processing is performed in the virtual space for the display device 100 of each of users, the user A cannot recognize the emotion the user B has toward the user A. In particular, in a case where the user B has negative emotion toward the user A, the above-described processing would be effective because the fact that the user B has negative emotion toward the user A would not be recognized by the user A.

Hereinabove, the setting of the basic virtual object in the present embodiment has been described. Hereinafter, an example in which a personal space set for the virtual object prohibits entrance of another virtual object will be described. Note that the personal space indicates a region prohibiting entrance of other virtual objects and thus may be referred to as a non-interference region. In FIGS. 12 to 15, the personal space will be illustrated using dotted lines.

FIG. 12 is a view illustrating an example in which a personal space is set for a virtual object corresponding to the user B. Furthermore, FIG. 12 is a view illustrating alteration in distance between virtual objects in a case where user's positive emotion is estimated. As illustrated in FIG. 12, in the virtual space for the display device 100 of the user B, the virtual object corresponding to the user A approaches the virtual object corresponding to the user B.

In the course where the virtual object corresponding to the user A approaches the virtual object corresponding to the user B, the virtual object corresponding to the user A comes in contact with a part of the personal space as indicated by a point P. At this time, the virtual object corresponding to the user A cannot come closer to the virtual object corresponding to the user B.

In this manner, setting the non-interference region would make it possible to prevent the virtual object corresponding to the user A from coming too close to the virtual object corresponding to the user B. This would enable the user B to receive the service in the virtual space without feeling a sense of oppression.

FIG. 13 is a view illustrating an example in which a personal space is set also for a virtual object corresponding to the user A. Furthermore, FIG. 13 is a view illustrating alteration in distance between virtual objects in a case where user's positive emotion is estimated. As illustrated in FIG. 13, in the virtual space for the display device 100 of the user B, the virtual object corresponding to the user A approaches the virtual object corresponding to the user B.

In the course where the virtual object corresponding to user A approaches the virtual object corresponding to user B, the personal space set for the virtual object corresponding to user A comes in contact with a part of the personal space set for the virtual object corresponding to user B, as indicated by point P. At this time, the virtual object corresponding to the user A would not come closer to the virtual object corresponding to the user B.

In this manner, setting the non-interference region would make it possible to prevent the virtual object corresponding to the user A from coming too close to the virtual object corresponding to the user B. This would enable the user A to receive the service in the virtual space without causing the virtual object corresponding to the user A to inadvertently approach the virtual object corresponding to the user B.

Note that the processing for the personal space described above is an example. Accordingly, in a case where the personal space is set for both virtual objects of the user A and the user B as illustrated in FIG. 14, the personal space set for virtual object of the user B may be prioritized.

That is, as indicated by point P in FIG. 14, the distance between virtual objects can be set small until the virtual object corresponding to user A comes in contact with the personal space set for the virtual object of user B.

Furthermore, in a case where the personal space is set for both virtual objects of the user A and the user B as illustrated in FIG. 15, the personal space set for virtual object of the user A may be prioritized.

That is, as indicated by point P in FIG. 15, the distance between virtual objects can be set small until the virtual object corresponding to the user B comes in contact with the personal space set for the virtual object of the user A.

Furthermore, the size of the personal space may be set on the basis of the static parameters described above. For example, the size of the personal space may be set in accordance with the height of the user. Specifically, in a case where the height of the user is large, the size of the personal space of the user may be set large. Furthermore, the size of the personal space may be set in accordance with the title of the user. Specifically, in a case of a user having a high-rank title, the size of the personal space of the user may be set large.

Figure 16:
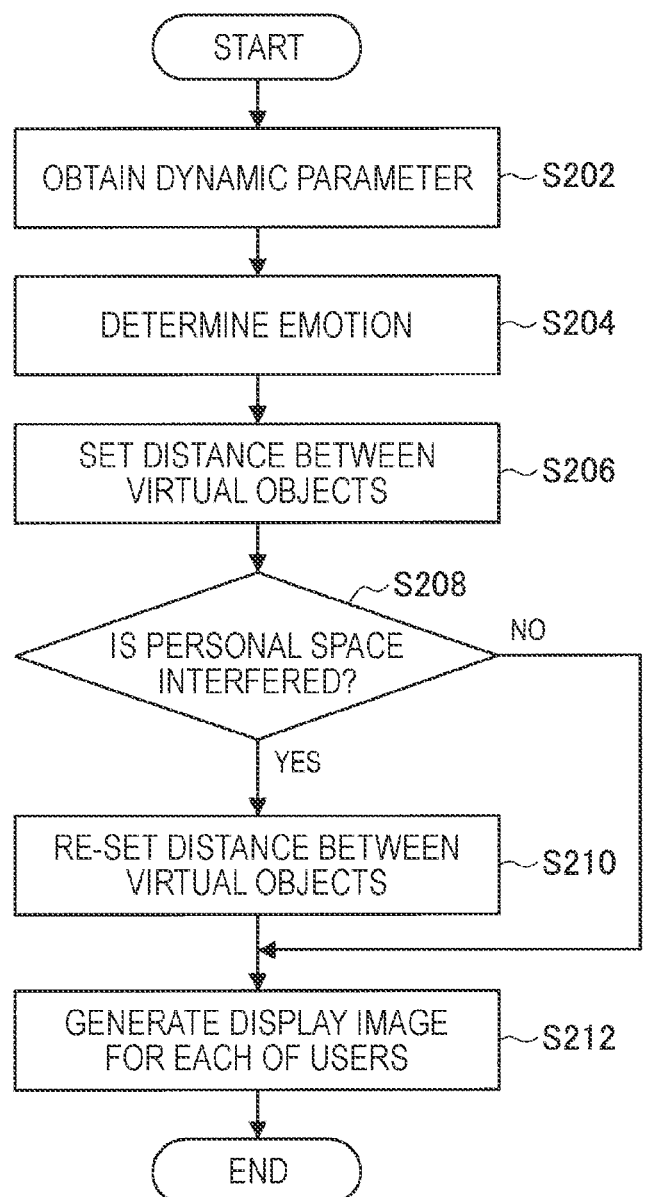
FIG. 16 is a chart illustrating an example of an information processing method according to an embodiment of the present disclosure.

FIG. 16 is a flowchart illustrating information processing for setting virtual objects using the above-described dynamic parameters. In S202, the information acquisition unit 408 obtains a dynamic parameter of a user from the display device 100 or the state detection device 200.

Next, in S204, the setting unit 410 estimates the user's emotion on the basis of the obtained dynamic parameter. Subsequently, the setting unit 410 sets, in S206, a distance between virtual objects on the basis of the emotion estimated in S204.

In S208, the setting unit 410 determines whether or not there is interference in the personal space set in the virtual object at the distance set in S206. In a case where there is interference in S208, the setting unit 410 re-sets, in S210, the distance between virtual objects so as to cause no interference. In a case where there is no interference in S208, processing proceeds to S212.

In S212, the information generation unit 412 generates a display image for the display device 100 of each of users on the basis of the distance between virtual objects set in S206 or S210.

Note that in the example of the information processing described above, the setting unit 410 estimates the user's emotion on the basis of the category of the dynamic parameter. However, the setting unit 410 need not estimate user's emotion. That is, the category of the dynamic parameter and the setting of the distance between virtual objects may be directly associated with each other. Specifically, in a case where the user strains one's eyes, the distance between virtual objects may be reduced. Furthermore, in a case where the body temperature of the user has risen, the distance between virtual objects may be increased.

Figure 17:
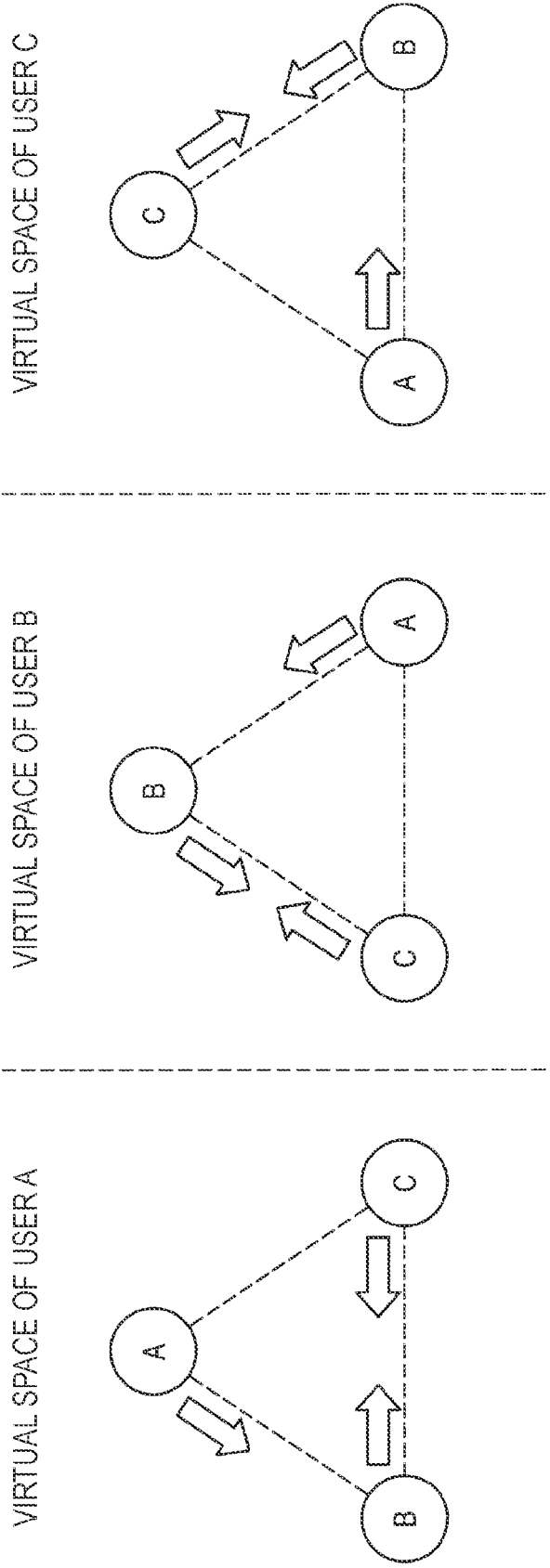
FIG. 17 is a view illustrating an example of setting a distance between virtual objects according to an embodiment of the present disclosure.

Note that information processing of the present embodiment is also applied to setting of virtual objects for a plurality of persons. FIG. 17 is a diagram illustrating a status of the virtual space for the display device 100 of each of users in a case where three people use the system of the present embodiment.

In FIG. 17, virtual objects corresponding to user A, user B, and user C are arranged on a triangle. Note that arrows in FIG. 17 indicate directions of virtual objects corresponding to user A, user B, and user C.

FIG. 18 is a view illustrating a status of the virtual space for the display device 100 of each of users in a case where the distance between the virtual objects illustrated in FIG. 17 has been re-set on the basis of the dynamic parameter. According to FIG. 18, user A has a positive emotion toward user B, user B has a positive emotion toward user C, and user C has a positive emotion toward user A. In this case, the virtual objects may move along sides of an equilateral triangle (or regular polygon in case of three or more users) so that the virtual objects corresponding to individual users do not overlap with each other.

Note that as illustrated in FIG. 18, in a case where the user makes behavior such as head swing after alteration of the distance between virtual objects, the face might not be oriented in the correct direction in some cases. Therefore, the present embodiment will perform picture correction for user's behavior such as head swing.

For example, in a case where the user B turns face in the direction of the user A in the virtual space for the display device 100 of the user B illustrated in FIG. 18, the virtual object of the user B makes behavior of head swing by 60°. However, in the virtual space for the display device 100 of the user A illustrated in FIG. 18, the virtual object of the user B would not be directed in the direction of the user A even if the user B swings head by 60°. This is because the positional relationship between the virtual object of the user A and the virtual object of the user B is different between the virtual space for the display device 100 of the user A and the virtual space for the display device 100 of the user B.

Therefore, in the present embodiment, in a case where the user B swings head by 60°, the setting unit 410 estimates that the user B wishes to direct own face in the direction of the user A, and then the information generation unit 412 performs, in the virtual space for the display device 100 of user A, picture processing to make the head of the virtual object of the user B appear to be swung by 90°. This processing enables natural display of the virtual space on the display device 100 of each of users.

<5. Grouping virtual objects using dynamic parameter>
Hereinabove, a virtual object setting method using a dynamic parameter according to an embodiment of the present disclosure has been described. Hereinafter, virtual object grouping using a dynamic parameter according to an embodiment of the present disclosure will be described.

Figures 19, 20:
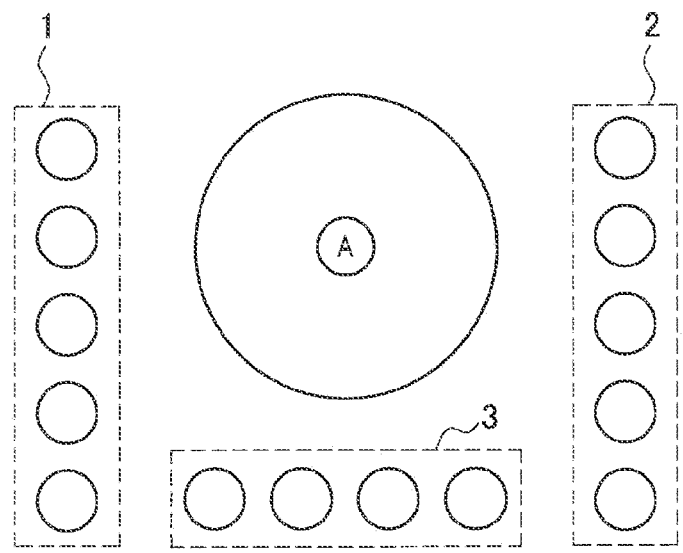
FIG. 19 is a view illustrating an example of virtual object grouping according to an embodiment of the present disclosure.
FIG. 20 is a diagram illustrating a relationship between virtual object groups and dynamic parameters in an embodiment of the present disclosure.

FIG. 19 is a diagram illustrating an example of grouping virtual objects using dynamic parameters. In FIG. 19, positions where virtual objects corresponding to audience user are arranged are grouped into three groups in a concert scene. In the present embodiment, the virtual object of each of users is classified into one of three groups on the basis of the dynamic parameter. For example, the three groups may be classified into a group of users who silently listen to the concert, a group of users who wish to sing, and a group of users who wish to dance.

Additionally, the virtual object of the group of the user who silently listens to the concert may be arranged at a position illustrated by "3" in FIG. 19. Furthermore, the virtual objects of the group of users who wish to sing may be arranged at a position indicated by "1" in FIG. 19. Furthermore, the virtual objects of the group of users who wish to dance may be arranged at a position indicated by "2" in FIG. 19.

FIG. 20 is a diagram illustrating a relationship between classification groups and dynamic parameters. For example, in a case where the user is sitting or not projecting voice, the user may be classified into the group of users who silently listen to the concert. Furthermore, in a case where the user is projecting voice, the user may be classified into a group of users who wish to sing. Furthermore, in a case where the user is standing or moving the body, the user may be classified into a group of users who wish to dance.

Note that the classification of the group described above is an example of a concert scene, and the classification of a group is not limited to it. For example, in the case of a conference scene, the groups may be classified into a group of speaking users and a group of users who take notes.

Note that the above-described group may be altered in accordance with a change of the dynamic parameter detected. For example, in a case where the sitting user stands up, the group may be altered from a silently listening group to a dancing group.

By grouping users in accordance with dynamic parameters in this manner, it is possible to achieve communication with users having higher similarities in accuracy. In particular, in the virtual space of a concert, it is possible to avoid disturbance by a user having different character, such as in a case where a silently listening user is disturbed by a dancing user.

Figure 21:
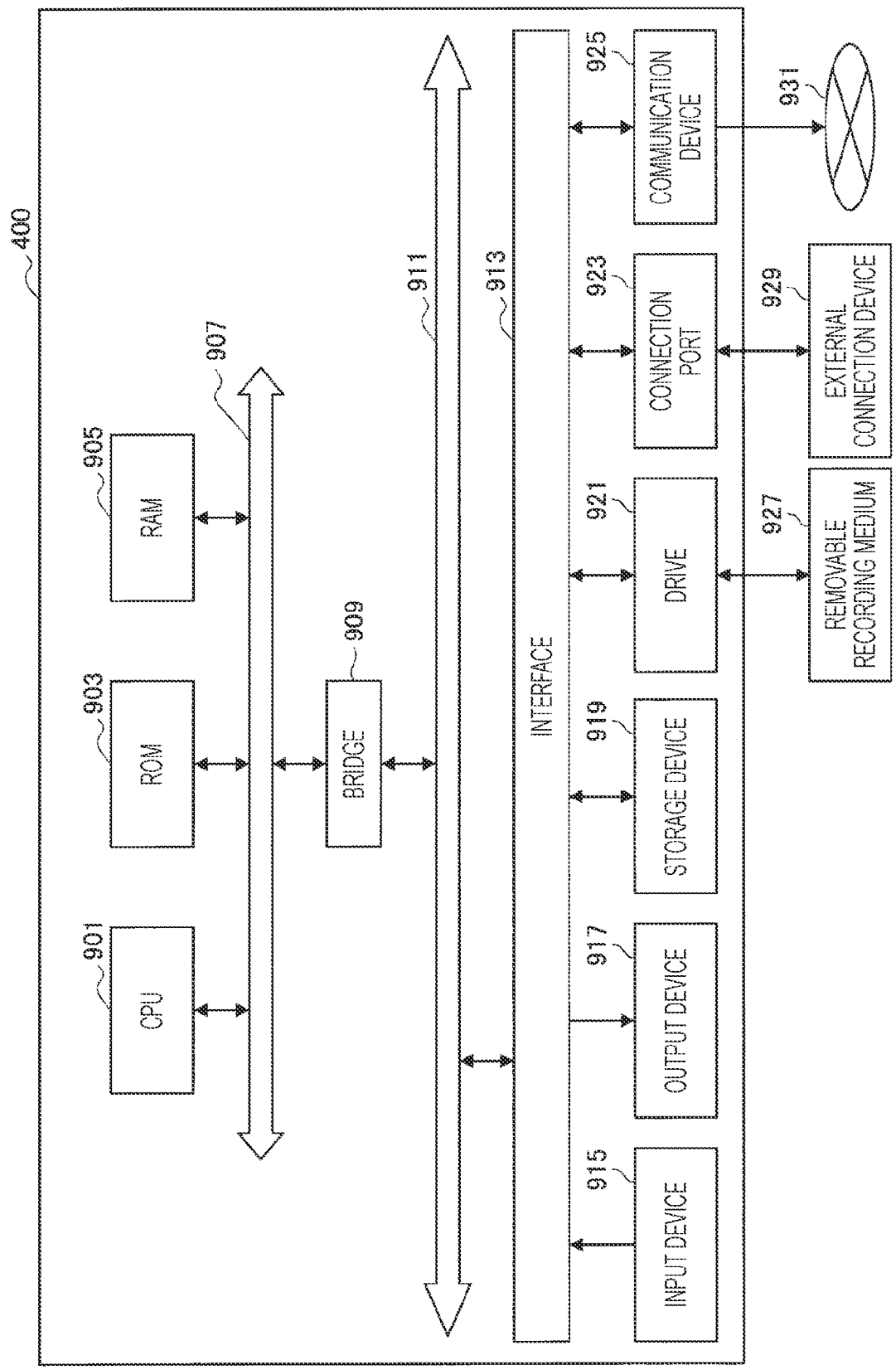
FIG. 21 is a diagram illustrating an example of a hardware configuration of a server according to an embodiment of the present disclosure.

<6. Hardware configuration of device> Hereinafter, a hardware configuration of the server 400 according to an embodiment of the present disclosure will be described in detail with reference to FIG. 21. FIG. 21 is a block diagram illustrating a hardware configuration of the server 400 according to an embodiment of the present disclosure.

The server 400 mainly includes a CPU 901, a ROM 903 and a RAM 905. The server 400 further includes a host bus 907, a bridge 909, an external bus 911, an interface 913, an input device 915, an output device 917, a storage device 919, a drive 921, a connection port 923, and a communication device 925.

The CPU 901 functions as a central processing unit and control unit, and controls all or part of operation in the server 400 in accordance with various programs recorded in the ROM 903, the RAM 905, the storage device 919, or a removable recording medium 927. Note that the CPU 901 may include the function of the processing unit 402. The ROM 903 stores programs, calculation parameters, or the like, used by the CPU 901. The RAM 905 temporarily stores programs used by the CPU 901 or parameters appropriately changing in execution of programs, or the like. These are mutually connected by the host bus 907 including an internal bus such as a CPU bus.

The input device 915 is an operation means operated by a user, such as a mouse, a keyboard, a touch panel, buttons, a switch, or a lever. Furthermore, the input device 915 includes, for example, an input control circuit that generates an input signal on the basis of information input by the user using the above-described operation means and that outputs the generated input signal to the CPU 901. The user operates the input device 915 to enable inputting various types of data or instructing processing operation to the server 400.

The output device 917 includes a device that can visually or audibly notify the user of obtained information. Examples of such devices include display devices such as CRT display devices, liquid crystal display devices, plasma display devices, EL display devices and lamps, audio output devices such as speakers and headphones, printer devices, mobile phones, facsimiles, or the like. The output device 917 outputs results obtained by various types of processing performed by the server 400, for example. Specifically, the display device displays the result obtained by the various types of processing performed by the server 400 as text or an image. Meanwhile, the audio output device converts an audio signal including reproduced audio data, sound data or the like into an analog signal and outputs the converted signal.

The storage device 919 is a data storage device configured as an example of the storage unit 406 of the server 400. The storage device 919 includes a magnetic storage device such as a hard disk drive (HDD), a semiconductor storage device, an optical storage device, a magneto-optical storage device, or the like. The storage device 919 stores programs to be executed by the CPU 901, various types of data, various types of data obtained from the outside, or the like.

The drive 921 is a reader/writer for a recording medium, built in or externally attached to the server 400. The drive 921 reads out information recorded on a removable recording medium 927 such as a mounted magnetic disk, optical disk, magneto-optical disk, semiconductor memory, or the like, and outputs the read-out information to the RAM 905. Furthermore, the drive 921 can also write a recording onto a removable recording medium 927 such as a mounted magnetic disk, optical disk, magneto-optical disk, semiconductor memory or the like. Examples of the removable recording medium 927 include a DVD medium, an HD-DVD medium, and a Blu-ray (registered trademark) medium. Furthermore, examples of the removable recording medium 927 may be a compact flash (CF) (registered trademark), a flash memory, a secure digital (SD) memory card), or the like. Furthermore, the removable recording medium 927 may be, for example, an integrated circuit card (IC card) on which a non-contact IC chip is mounted, an electronic device, or the like.

The connection port 923 is a port for directly connecting a device to the server 400. Examples of the connection port 923 can be a universal serial bus (USB) port, an IEEE 1394 port, a small computer system interface (SCSI) port, or the like. Other examples of the connection port 923 may be an RS-232C port, an optical audio terminal, a high-definition multimedia interface (HDMI) (registered trademark) port, or the like. By connecting an external connection device 929 to the connection port 923, the server 400 obtains various types of data directly from the external connection device 929, and provides various types of data to the external connection device 929.

An example of the communication device 925 is a communication interface including communication devices, or the like for connecting to a communication network 931. Examples of the communication device 925 include a communication card for a wired or wireless local area network (LAN) or wireless USB (WUSB), or the like. Furthermore, the communication device 925 may be a router for optical communication, a router for asymmetric digital subscriber line (ADSL), a modem for various types of communication, or the like. The communication device 925 can transfer signals or the like through the Internet or with other communication devices in accordance with a predetermined protocol such as TCP/IP, for example. Furthermore, the communication network 931 connected to the communication device 925 may include a wired or wireless network, or the like and may be, for example, the Internet, home LAN, infrared communication, radio wave communication, satellite communication, or the like.

<7. Supplementary matter> Hereinabove, the preferred embodiments of the present disclosure have been described above with reference to the accompanying drawings, while the technical scope of the present disclosure is not limited to the above examples. A person skilled in the art in the technical field of the present disclosure may find it understandable to reach various alterations and modifications within the technical scope of the appended claims, and it should be understood that they will naturally come within the technical scope of the present disclosure.

For example, in the above-described example, the server 400 performs control or processing of the virtual space and virtual objects. However, the information processing system of the present embodiment may be configured without including the server 400. For example, the information processing performed by the information processing system of the present embodiment may be performed by the plurality of display devices 100 and the state detection device 200 operating in cooperation. At this time, one of the plurality of display devices 100 and the state detection device 200 may perform control or processing performed by the server 400 in the present embodiment, instead of the server 400. Furthermore, the plurality of display devices 100 and the state detection devices 200 may dispersedly perform the control or processing performed by the server 400 in the present embodiment.

Furthermore, the above-described example is an exemplary case in which the distance between virtual objects is altered. However, examples of altering the display mode of the virtual object are not limited to it. For example, in a case where the user B is determined to have a negative emotion, the virtual object corresponding to the user A may be replaced with a virtual object of an animal, for example. Furthermore, the virtual object corresponding to user A may be partially deformed. For example, the deformation may be performed to enlarge the eyes of the virtual object corresponding to the user A.

Furthermore, in the example using FIG. 10, in a case where the user B is estimated to have a positive emotion toward the user A, the virtual object corresponding to the user A approaches to the virtual object corresponding to the user B in the virtual space for the display device 100 of the user B. That is, the position of the virtual object of the user A has been altered in the virtual space corresponding to the display device 100 of the user B on the basis of the change of the dynamic parameter of the user B. Alternatively, however, the position of the virtual object of the user A may be altered in the virtual space corresponding to the display device 100 of the user B on the basis of the change of the dynamic parameter of the user A. That is, in a case where the user A is estimated to have a positive emotion toward the user B, the virtual object corresponding to the user A may approach the virtual object corresponding to the user B in the virtual space for the display device 100 of the user B. Note that such control may be performed in a case where the user A has a positive feeling toward the user B, and need not be performed in a case where the user A has a negative emotion toward the user B.

Furthermore, a computer program may be provided for causing the processing unit 102 of the display device 100, the processing unit 202 of the state detection device 200, and the processing unit 402 of the server 400 to perform the operations as described above. Furthermore, a storage medium that stores these programs may be provided.

<8. Conclusion> As described above, the information processing system of the present disclosure sets the position of the virtual object corresponding to each of users on the basis of the static parameter of each of the users. By arranging the virtual objects in this manner, the user can easily receive a service using a virtual space without a need to set the position of the virtual objects in the virtual space. This enables the user to further concentrate on the user's purpose.

Furthermore, the information processing system according to the present disclosure sets the position of the virtual object corresponding to each of users on the basis of a user's dynamic parameter. In this manner, by setting the distance between virtual objects, the user can stay away from a virtual object of an unpleasant user and can approach a virtual object of a cozy user. Therefore, the information processing system according to the present embodiment can automatically set a distance comfortable for each of users from the user's unconscious action, such as the user's posture or facial expression during communication, and automatically adjust a distance to the other party.

Furthermore, a virtual space picture mutually different for each of users may be presented in the information processing system of the present disclosure. In this manner, by controlling virtual space, the user A can, for example, stay away from a virtual object of an unpleasant user while preventing the unpleasant feeing the user A has about the user B from being recognized by the user B. Accordingly, the information processing system of the present embodiment can adjust the position of the virtual object to a position enabling the user to easily perform communication without giving an unpleasant feeling to the other party.

Note that the following configuration should also be within the technical scope of the present disclosure.

(1)

An information processing apparatus including:
    an information acquisition unit that obtains first state information regarding a state of a first user; and
    a setting unit that sets, on the basis of the first state information, a display mode of a second virtual object in a virtual space in which a first virtual object corresponding to the first user and the second virtual object corresponding to a second user are arranged.

(2)

The information processing apparatus according to (1), in which the setting of the display mode includes setting of a distance between the first virtual object and the second virtual object.

(3)

The information processing apparatus according to (2),
    in which the first state information is classified into a plurality of categories,
    the setting unit determines the category of the first state information,
    reduces the distance between the first virtual object and the second virtual object in a case where the first user is determined to be positive as a result of the determination, and
    increases the distance between the first virtual object and the second virtual object in a case where the first user is determined to be negative as a result of the determination.

(4)

The information processing apparatus according to any one of (1) to (3), in which the setting unit sets a display mode of the second virtual object in the virtual space for a first device of the first user and a display mode of the first virtual object in the virtual space for a second device of the second user such that the display modes differ from each other.

(5)

The information processing apparatus according to (4), in which the setting unit alters the display mode of the second virtual object in the virtual space for the first device on the basis of the first state information, and performs no alteration of the display mode of the first virtual object in the virtual space for the second device based on the first state information.

(6)
The information processing apparatus according to (4) or (5), in which the virtual space for the first device and the virtual space for the second device are a same virtual space.

(7)
The information processing apparatus according to any one of (2) to (6), in which the setting unit sets the distance between the first virtual object and the second virtual object on the basis of a non-interference region for the first virtual object or a non-interference region for the second virtual object.

(8)
The information processing apparatus according to (7),
in which the non-interference region for the first virtual object is set on the basis of information regarding an attribute of the first user, and
the non-interference region for the second virtual object is set on the basis of information regarding an attribute of the second user.

(9)
The information processing apparatus according to (7), in which the setting unit sets the distance between the first virtual object and the second virtual object so as not to allow entrance of the second virtual object into the non-interference region for the first virtual object.

(10)
The information processing apparatus according to (7), in which the setting unit sets the distance between the first virtual object and the second virtual object so as not to allow entrance of the first virtual object into the non-interference region for the second virtual object.

(11)
The information processing apparatus according to (7), in which the setting unit sets the distance between the first virtual object and the second virtual object so as not to allow overlapping of the non-interference region for the first virtual object with the non-interference region for the second virtual object.

(12)
The information processing apparatus according to any one of (1) to (11),
in which the information acquisition unit obtains second state information regarding a state of the second user, and
the setting unit sets the display mode of the second virtual object on the basis of the second state information.

(13)
The information processing apparatus according to (12),
in which the first state information is information regarding behavior or biometric information of the first user, and
the second state information is information regarding behavior or biometric information of the second user.

(14)
The information processing apparatus according to (13),
in which the information regarding the behavior includes any one of pieces of information regarding user's facial expression, blinks, posture, vocalization, and a line-of-sight direction, and
the biometric information includes any one of pieces of information regarding user's heart rate, body temperature, and perspiration.

(15)
The information processing apparatus according to any one of (1) to (14), in which the setting unit sets the first virtual object to one of a plurality of groups in the virtual space on the basis of the first state information.

(16)
The information processing apparatus according to any one of (1) to (15), in which the setting unit sets a position of the first virtual object in the virtual space on the basis of a static parameter of the first user.

(17)
The information processing apparatus according to (16), in which the static parameter includes a user attribute of the first user or a role of the first user in the virtual space.

(18)
The information processing apparatus according to (16) or (17),
in which the virtual space includes a plurality of scenes, and
the setting unit sets the position of the first virtual object in accordance with one of the plurality of scenes set as the virtual space.

(19)
An information processing method including:
obtaining first state information regarding a state of a first user; and
setting, by a processor, on the basis of the first state information, a display mode of a second virtual object in a virtual space in which a first virtual object corresponding to the first user and the second virtual object corresponding to a second user are arranged.

(20)
A program for causing a processor to execute:
obtaining first state information regarding a state of a first user; and
setting, on the basis of the first state information, a display mode of a second virtual object in a virtual space in which a first virtual object corresponding to the first user and the second virtual object corresponding to a second user are arranged.

REFERENCE SIGNS LIST

100 Display device
102 Processing unit
104 Communication unit
106 Display unit
108 Imaging unit
110 Sensor
112 Facial expression detection unit
114 Line-of-sight detection unit
200 State detection device
202 Processing unit
204 First communication unit
206 Second communication unit
208 Imaging unit
210 Microphone
212 Physical condition detection unit
300 Network
400 Server
402 Processing unit
404 Communication unit
406 Storage unit
408 Information acquisition unit 410 Setting unit
412 Information generation unit

What is claimed is:

1. An information processing apparatus, comprising:
circuitry configured to:
 acquire a first static parameter;
 control a display to display a first virtual object related to a first user in a virtual space;
 control the display to display a second virtual object related to a second user in the virtual space;
 set, based on the first static parameter, a first closest distance, representing a first minimum allowable distance the first virtual object and the second virtual object can approach each other in the virtual space;
 acquire a second static parameter different from the first static parameter; and
 set, based on the second static parameter, a second closest distance, representing a second minimum allowable distance the first virtual object and the second virtual object can approach each other in the virtual space,
wherein the first closest distance is less than the second closest distance.

2. The information processing apparatus according to claim 1, wherein a boundary of a first personal space related to the first virtual object is touching, at the second closest distance, a boundary of a second personal space related to the second virtual object.

3. The information processing apparatus according to claim 2, wherein the first virtual object is restricted from being displayed inside the second personal space.

4. The information processing apparatus according to claim 2, wherein the first personal space is a circle shape.

5. The information processing apparatus according to claim 2, wherein a setting of the first personal space is prioritized over a setting of the second personal space.

6. The information processing apparatus according to claim 1, wherein the first virtual object and the second virtual object are each shaped in a form of a person.

7. The information processing apparatus according to claim 1, wherein
the circuitry is further configured to:
 control the display to display a third virtual object related to a third user in the virtual space, and
the displaying of the first virtual object, the second virtual object, and the third virtual object is controlled based on a situation of the first user.

8. The information processing apparatus according to claim 1, wherein the information processing apparatus is a head mounted display.

9. An information processing apparatus, comprising:
circuitry configured to:
 acquire a first static parameter;
 control a display to display, based on the first static parameter, a first virtual object in a condition of being restricted from being displayed within a first closest distance of a second virtual object;
 acquire a second static parameter different from the first static parameter; and
 control the display to display, based on the second static parameter, the first virtual object in a condition of being restricted from being displayed within a second closest distance of the second virtual object,
wherein the first closest distance is less than the second closest distance.

10. The information processing apparatus according to claim 9, wherein
the first virtual object corresponds to a first user, and
the circuitry is further configured to:
 control the display to display the second virtual object that corresponds to a second user.

11. The information processing apparatus according to claim 10, wherein the first virtual object is displayed in the condition of being restricted from being displayed within the first closest distance or the first virtual object is displayed in the condition of being restricted from being displayed within the second closest distance, based on static parameters associated with the first and second users.

12. The information processing apparatus according to claim 9, wherein
the circuitry controls the display to display, based on the first static parameter, the first virtual object in a condition of being restricted from being displayed within the first closest distance from the second virtual object that is being displayed in a same virtual space as the displayed first virtual object, and
the circuitry controls the display to display, based on the second static parameter, the first virtual object in a condition of being restricted from being displayed within the second closest distance from the second virtual object that is being displayed in the same virtual space as the displayed first virtual object.

13. The information processing apparatus according to claim 12, wherein a boundary of a first personal space related to the second virtual object is touching, at the second closest distance, a boundary of a second personal space related to the first virtual object.

14. The information processing apparatus according to claim 13, wherein the first virtual object is restricted from being displayed inside the first personal space.

15. The information processing apparatus according to claim 13, wherein the second personal space is a circle shape.

16. The information processing apparatus according to claim 13, wherein a setting of the first personal space is prioritized over a setting of the second personal space.

17. The information processing apparatus according to claim 12, wherein the first virtual object and the another second virtual object are each shaped in a form of a person.

18. The information processing apparatus according to claim 12, wherein
the first virtual object corresponds to a first user,
the second object corresponds to a second user,
the circuitry is further configured to:
 control the display to display a third virtual object that corresponds to a third user, and
the displaying of the first virtual object, the second virtual object, and the third virtual object is controlled based on a situation of the second user.

19. The information processing apparatus according to claim 9, wherein the information processing apparatus is a head mounted display.

20. The information processing apparatus according to claim 9, wherein
the circuitry is further configured to:
 consistently restrict, during the display of the first virtual object, the first virtual object from being displayed within the first closest distance based on the first static parameter; and
 consistently restrict, during the display of the first virtual object, the first virtual object from being displayed within the second closest distance based on the second static parameter.

21. The information processing apparatus according to claim 9, wherein
the first static parameter is configured by a user of the first virtual object for the first virtual object.

22. The information processing apparatus according to claim 9, wherein
the circuitry controls the display to display, based on the first static parameter, the first virtual object in the condition of being restricted from being displayed within the first closest distance during movement of the first virtual object; and
the circuitry controls the display to display, based on the second static parameter, the first virtual object in the condition of being restricted from being displayed within the second closest distance during movement of the first virtual object.

23. An information processing system, comprising:
a display device;
an imaging sensor; and
circuitry configured to:
acquire a first static parameter;
control to display, on the display device and based on the first static parameter, a first virtual object in a condition of being restricted from being displayed within a first closest distance of a second virtual object;
acquire a second static parameter different from the first static parameter; and
control to display, on the display device and based on the second static parameter, the first virtual object in a condition of being restricted from being displayed within a second closest distance of the second virtual object,
wherein the first closest distance is less than the second closest distance.

* * * * *